3,414,398
METHOD FOR THE SELECTIVE CONTROL OF YELLOW OXALIS WITH THIOCYANATE

Ralph L. Chacon, 1850 N. Whitley Ave.,
Los Angeles, Calif. 90028
No Drawing. Filed July 23, 1965, Ser. No. 474,462
7 Claims. (Cl. 71—65)

ABSTRACT OF THE DISCLOSURE

A method for selectively controlling the growth of yellow oxalis (*Oxalis corniculata*) present in dichondra and grass lawns is provided which comprises applying an aqueous solution containing sodium thiocyanate or potassium thiocyanate in a concentration and amount sufficient to destroy the yellow oxalis but insufficient to destroy material quantities of the dichondra and grass lawns.

---

My invention relates to the selective control of *Oxalis corniculata*, which is commonly known as yellow oxalis, and of *Euphorbia maculata* and *Euphorbia supina*, which is commonly known as prostrate spurge, in dichondra and grass lawns. Yellow oxalis is a serious pest in dichondra and grass lawns and propagates rapidly from seed in many areas of the United States.

I have discovered that aqueous solutions containing sodium thiocyanate or potassium thiocyanate or combinations thereof as the active ingredients can be used effectively to control *Oxalis corniculata*, *Euphorbia maculata* and *Euphorbia supina* in dichondra and grass lawns. The concentration of the thiocyanate compound in the solution as applied to the infested area is extremely critical.

The use of sodium or potassium thiocyanate as a selective herbicide, and particularly as a selective herbicide for the control of *Oxalis corniculata*, *Euphorbia maculata* or of *Euphorbia supina* in dichondra and grass lawns has been hitherto unknown.

Either sodium thiocyanate or potassium thiocyanate or a combination of the two may be used. As stated above, the concentration of the thiocyanate compound in the aqueous solution as applied to the infested area is extremely critical.

While an aqueous solution consisting of sodium or potassium thiocyanate and water alone may be used, I prefer to use a solution which includes both a wetting agent and an aliphatic alcohol, which enhance the herbicidal action on the weeds mentioned above.

The use of wetting agents in herbicidal solutions is well known. By increasing the ability to "wet" the vegetation thoroughly, the wetting agent increases the effectiveness of the herbicidal action.

Any suitable water soluble wetting agent may be used. For example, octophenoxy polyethoxy ethanol with alkylsulphate, alkylphenoxy polyethoxy ethanol, containing 9 moles of ethylenechloride and alkylated aryl polyether alcohol with 9–10 moles of ethylene oxide.

Any aliphatic alcohol with one to three carbon atoms may be used. I prefer to use methanol or iso-propyl alcohol because of their low cost and availability.

The alcohol helps to increase plant tissue penetration of the active ingredients and thereby increase the effectiveness of the herbicide.

The percentages of both the wetting agent and of the alcohol may be varied within wide limits. For example, the alcohol content may be varied from 0% to 15% by weight of the total composition, and the wetting agent may be varied from 0% to 6% by weight of the total composition.

Examples of concentrates useful in my invention are:

Example No. 1:                                                  Pounds
  Sodium thiocyanate (technical grade—98%) ___ 25
  Isopropyl alcohol _____ 10
  Octylphenoxy polyethoxy ethanol containing
    5 moles of ethylenechloride _____ 4
  Water _____ 61

Example No. 2:                                                  Pounds
  Potassium thiocyanate (technical grade—98%)  25
  Nonylphenol containing 9 moles of ethylene
    oxide _____ 4
  Water _____ 71

The concentration of the thiocyanate compound in the solution applied to the yellow oxalis, the *Euphorbia maculata* and the *Euphorbia supina* is extremely critical. On young oxalis I prefer to apply one (1) fluid ounce of a concentrate of my invention in one (1) gallon of water to uniformly cover approximately 100 square feet of yellow oxalis. Thorough wetting of the foilage of the yellow oxalis is essential for best results.

If the foliage of the yellow oxalis is heavily matted, more of the solution will be needed to thoroughly wet the foliage of the yellow oxalis, and, hence, less than 100 square feet of yellow oxalis will be covered by one gallon of solution.

The above dosage is adequate to control or eradicate the yellow oxalis, *Euphorbia maculata* and *Euphorbia supina* in their young stages of growth. On older infestations such weeds I prefer to use from 2 to 6 ounces of a concentrate of my invention in one (1) gallon of water applied to thoroughly wet all exposed parts of the infestations.

The concentration of the thiocyanate compound in the aqueous solution applied to the weed must be limited from substantially .17% by weight to substantially 1.4% by weight of the total weight of the aqueous solution as applied to the infested areas.

If the concentration of the thiocyanate compound is substantially less than .17% by weight, the herbicidal action of the solution is insufficient to effect the desired control of the weeds. If the concentration of the thiocyanate compound is substantially greater than 1.4% by weight, the selective herbicidal action of the thiocyanate compound may injure the dichondra or grass lawns.

Application of the solution directly to the soil, as compared to the foliage of the oxalis, *Euphorbia maculata* or of the *Euphorbia supina*, does not effect the control or eradication of the infestations. The control or eradication of the infestations are effected primarily by translocation.

From three-quarters of one fluid ounce to six fluid ounces of one of the concentrates described above may be applied in one (1) gallon of water to the infested areas. There are a number of variable factors that affect the killing action of the applied herbicide, and hence, the concentration of the thiocyanate compound in the applied solution and the amount of solution to be applied to the infested areas. These factors include:

(1) The method of applying the solution;
(2) The age and matting of the oxalis or of the supina;
(3) The age of the dichondra or grass;
(4) The ambient temperature; and
(5) The moisture content of the soil.

A more effective control or eradication of the yellow oxalis, *Euphorbia maculata* or of the *Euphorbia supina* is had when the solution is applied with a pressure-type sprayer with the nozzle adjusted to deliver a medium spray instead of a mist or fog. A sprinkling can may also be used if the sprinkler head is provided with small bore holes, which is usually the case with metal sprinkling cans.

A more effective eradication of the infestation is effected with an increase in the atmospheric temperature. For example, a more effective eradication is effected at an atmospheric temperature of 80° F. as compared to 70° F. The treatment is not effective in rainy weather when the grass or dichondra has excessive moisture, or when the ground cover is watered after the solution is applied, due to the dilution of the effective agent, namely, the thiocyanate. Watering the ground cover should be withheld forty-eight (48) hours after the application of the solution.

The solution of my invention should not be used on grass or dichondra lawns grown from seed under six (6) weeks old.

On mature plants of yellow oxalis, *Euphorbia maculata* and *Euphorbia supina* and in instances in which the solution is applied inadequately or under unfavorable conditions, more than one application of the solution of my invention may be required to obtain control or eradication. The solution may be applied repeatedly with no time limit between spraying for spot treatment of areas that may have been missed in the first application, or for treatment of subsequent infestations.

From the foregoing description, the uses and advantages of my invention will be readily understood by those skilled in the art to which the invention appertains. While I have described my invention in detail and with respect to preferred examples thereof, I desire to have it understood that the examples described are merely illustrative and that the invention is not to be limited to the details disclosed herein, but is to be accorded the full scope of the appended claims.

I claim:
1. The method of selectively controlling the growth of *Oxalis corniculata* present in dichondra and grass lawns which comprises applying to the lawn area containing the *Oxalis corniculata* an aqueous solution comprising a thiocyanate selected from the group consisting of sodium thiocyanate and potassium thiocyanate in a concentration and amount sufficient to destroy the *Oxalis corniculata* but insufficient to destroy material quantities of said dichondra and grass lawns.
2. The method of claim 1 in which said aqueous solution contains an aliphatic alcohol containing not more than three (3) carbon atoms.
3. The method of claim 1 in which said aqueous solution contains a wetting agent.
4. The method of selectively controlling the growth of *Oxalis corniculata* present in dichondra and grass lawns which comprises applying to the lawn area containing the *Oxalis corniculata* an aqueous thiocyanate solution selected from the group consisting of sodium thiocyanate and potassium thiocyanate in which the concentration of the thiocyanate compound by weight is from substantially .17% to substantially 1.4% of the weight of the solution and results in no material destruction of said dichondra and grass lawns.
5. The method of claim 4 in which said aqueous solution contains an aliphatic alcohol containing not more than three (3) carbon atoms.
6. The method of claim 4 in which said aqueous solution contains a wetting agent.
7. The method of claim 4 in which said aqueous thiocyanate solution contains sodium thiocyanate in a concentration of from substantially .17% to substantially 1.4% of the weight of the solution.

References Cited

UNITED STATES PATENTS

| 1,997,750 | 4/1935 | Sauchelli | 71—2.2 |
| 2,269,397 | 1/1942 | Osborne | 71—2.2 |
| 2,546,551 | 3/1951 | Lento et al. | 71—2.2 |

OTHER REFERENCES

Rochecouste et al.: "Weeds of Mauritius," etc. (1959–1961) I, II, III and IV. Biol. Abstr. 37 (March 1962) p. 2476, Ahlgren et al.: "Principles of Weed Control," Wiley & Sons (1951) pp. 305–306, SB611 A35.

Hurdkarrer: "Relation of Soil Reaction to Toxicity and Persistence of Some Herbicides in Greenhouse Plots," CA40 pp. 5186–5187 (1946).

Sigalow: "An Effective Herbicide to Wipe Out Unnecessary Vegetation," CA54 p. 15810 (1958).

LEWIS GOTTS, *Primary Examiner.*

G. HOLLRAH, *Assistant Examiner.*